United States Patent Office

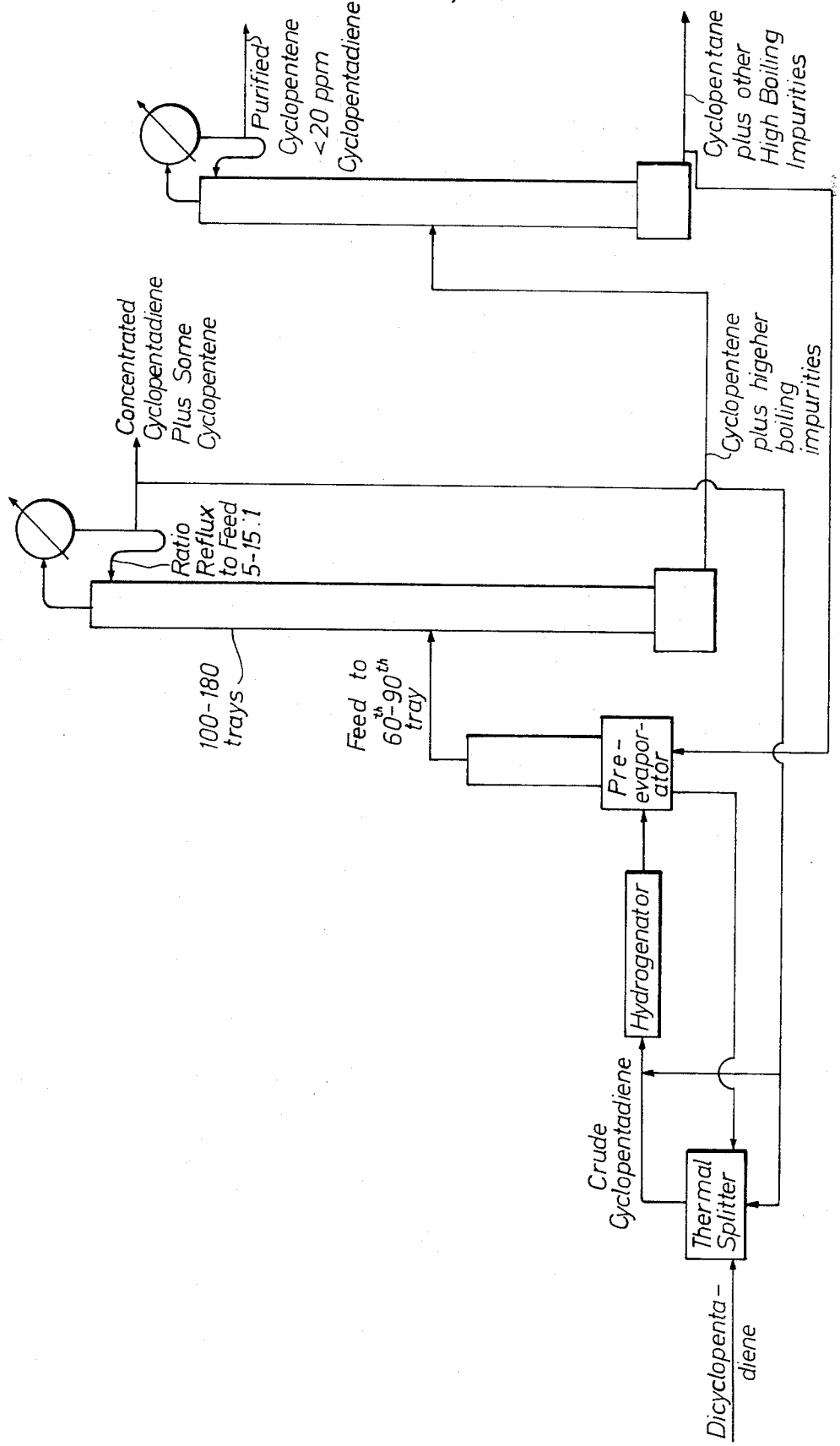

3,763,254
Patented Oct. 2, 1973

3,763,254
RECOVERY OF PURE CYCLOPENTENE
Bruno Engelhard, Leverkusen, and Heinrich Steude, Bergisch Gladbach, Germany, assignors to Bayer Aktiengesellschaft, Leverkusen, Germany
Filed June 15, 1972, Ser. No. 263,090
Claims priority, application Germany, Dec. 2, 1971,
P 21 59 832.3
Int. Cl. C07c 3/00
U.S. Cl. 260—666 A        6 Claims

ABSTRACT OF THE DISCLOSURE

In the production of pure cyclopentene by thermally splitting dicyclopentadiene to a product comprising cyclopentadiene, hydrogenating the product to convert cyclopentadiene to cyclopentene, and distilling the product in a cyclopentene-distillate column to recover pure cyclopentene, the improvement which comprises delivering the cyclopentene-containing product to be distilled to about the 60th to 90th tray of a cyclopentadiene-distillate column having about 100 to 180 trays, boiling off at the head of said column cyclopentadiene and other low-boiling components, condensing the distillate and recycling the major portion thereof to said column to establish a ratio of reflux to feed of about 5–15:1, withdrawing as the residue from said column a product containing less than about 20 p.p.m. of cyclopentadiene, and delivering said distillation residue to said cyclopentene-distillate column, the residue in said cyclopentene-distillate column comprising cyclopentane and other high-boiling components.

---

The invention relates to a process for the purification by distillation of cyclopentene which is contaminated by other hydrocarbons, in particular by cyclic $C_5$ hydrocarbons, to render it of suitable quality for polymerization.

Cyclopentene is increasing in importance as a hydrocarbon for the production of high-grade polymers. The standard purity which is required of cyclopentene for polymerization, however, is very high in particular with respect to the content of cyclopentadiene, other dienes and acetylenes. These compounds are contained as impurities in crude cyclopentene, as it is obtained when dicyclopentadiene is thermally split to cyclopentadiene, for example, according to the process of German DOS 2,019,596, and cyclopentadiene thereafter selectively hydrogenated to cyclopentene, for example, according to Belgian patent specification 767,549, or as it is available on working up the cyclopentene part of the $C_5$ fraction of naphtha crackers, possibly after previous selective hydrogenation of this entire fraction, for example, according to the process of U.S. patent specification 3,565,963.

The present invention refers particularly to the purification of cyclopentene which was recovered by splitting dicyclopentadiene and hydrogenating the resulting cyclopentadiene. The main impurities in the cyclopentene which is recovered according to this method comprise up to about 10% by weight of cyclopentadiene which was not reacted on hydrogenation, up to about 20% by weight of cyclopentane which arises on over-hydrogenation, as well as up to about 20% by weight of hydrocarbons with 4–10 carbon atoms which are not completely separated on the recovery of cyclopentadiene.

Cyclopentene which is to be employed for polymerization must be very pure. A certain percentage of saturated aliphates and cycloaliphates are permissible, but the content of olefins and diolefins may only amount to a few hundred p.p.m. (cf. U.S. patent specification 3,565,963), the highest permissible limit specifically for cyclopentadiene being only 20 p.p.m.

The recovery of such pure cyclopentene from crude cyclopentene having, for example, the above-given composition cannot be carried out by normal distillation for economic reasons due to the physical characteristics of the components (cf. U.S. patent specification 3,565,963). In such a separation process all low-boiling components, including cyclopentadiene, would have to be separated from cyclopentene in a first column and the separation of cyclopentene-cyclopentane would finally take place in a second column, all other high-boiling components remaining in the sump. Separation of the pentanes (boiling range 27.8°–36.1° C.) and pentenes (boiling range 26.5°–38.4° C.) from cyclopentene (boiling point 44.2° C.) could succeed in the first column; however, the separation of cyclopentadiene (boiling point 41.8° C.) to a value of below 20 p.p.m. in the residue would present an almost insuperable obstacle, and the cyclopentadiene which remains in the sump product of the first column would contaminate the pure cyclopentene coming off at the head of the second column for the following reasons:

The ratio of vapor pressures, which is termed relative volatility and used to calculate the energy required for effecting separation (cf. Ullmann's Encyclopaedia of Technical Chemistry, München-Berlin, 1. vol. 1951, p. 439), is given in the literature as 1.12 to 1.13 for cyclopentadiene-cyclopentene (cf. U.S. patent specification 3,230,157 and Khimicheskaya promyschlennost 1971, 4, pp. 256/259). This value is so small that a reasonably economical separation does not appear possible as is also supposed to be the case in U.S. patent specification 3,565,963. If a calculation is made with the help of the Fenske equation (cf. Ullmann's Encyclopaedia of Technical Chemistry, 1. vol., 1951, p. 439), then it can be seen that a column with over 250 trays would be necessary and the energy required would be 3.0 million cal. per ton of cyclopentene.

Another method of recovering pure cyclopentene is conceivable in that, in addition to using a light ends and a heavy ends column, a third column is employed in which the cyclopentadiene separation takes place by means of extractive distillation. For the polar solvent dimethylformamide, which is very often employed in extractive distillation, the relative volatilities for cyclopentadiene and cyclopentene are between 1.5 and 1.8, depending on the concentration of the solvent (cf. Khimicheskaya promyshlennost 1971, 4, p. 257).

Other solvents customary in extractive distillation have similar values, e.g. 2.1 for N-methylpyrrolidone. This means that in principle separation can be carried out in this way. However, this method has the disadvantage that three distillation columns are necessary and that extractive distillation, due to the large amount of solvent in circulation and poor tray efficiency always requires considerably more outlay than normal distillation (cf. Chemical Engineering Progress 65 (1969) 9, pp. 43/46).

Accordingly it is an object of the invention to provide a simple, economical straight-forward distillation process for obtaining cyclopentene having less than 20 p.p.m. of cyclopentadiene from cyclopentene which has been obtained by thermally splitting dicyclopentadiene and hydrogenating the products to cyclopentene.

These and other objects and advantages are realized in accordance with the present invention pursuant to which the crude cyclopentene is introduced into the middle region of a distillation column containing about 100 to 180 trays and cyclopentadiene as well as other low-boiling components are separated at the head of this column at a ratio of reflux to feed of about 5:1 to 15:1, preferably about 8:1 to 10:1, and a product containing less than 20 p.p.m. cycloptentadiene is drawn off as the sump which is then fed into a second column, wherein cyclopentane and other high-boiling components are obtained as the sump in a manner known per se and pure cyclopentene accumulates as the head product.

The drawing sets forth a schematic flow sheet of a preferred process is accordance with the invention.

The starting material for the process according to the invention is crude cyclopentene usually having the following approximate composition:

Pentanes: up to 5% by wt., preferably 0.5–3% by wt.
Pentenes: up to 5% by wt., preferably 0.5–3% by wt.
Isoprene: up to 0.1% by wt. preferably up to 0.05% by wt.
Cyclopentadiene: 0.1 to 10% by wt., preferably 0.1–7% by wt.
Cyclopentene: 50–95% by wt., preferably 70–95% by wt.
Cyclopentane: 2–20% by wt., preferably 2–15% by wt.
Dicyclopentadiene: up to 10% by wt., preferably 0–3% by wt.
Dimers+heavy ends: up to 20% by wt., preferably 1–15% by wt.

This product is generally introduced in liquid or vaporous from into the middle region, preferably between about the 60th and 90th tray, counting from the bottom, of a distillation column having about 100 to 180 preferably about 110 to 160 trays. A column is customarily used which permits working at pressures between about 1 and 4 atmospheres and is preferably used at normal pressure or under slight excess pressure. As tray there may be used bubble cap trays, sieve trays or other customary distillation devices. It is advisable to employ trays or mountings which holds the smallest possible amount of liquid. The evaporator of the column preferably consists of a reboiler. The vapors at the head of the column are completely condensed in a condenser. It is expedient to draw off a branch stream, the amount depending on the content of the light-boiling components in the starting product, said branch stream containing about 30 to 60% of cyclopentadiene and 10 to 50% of cyclopentene. Under certain circumstances it is advantageous to recycle the head product of the first column completely or partially into the splitting stage of the dicyclopentadiene or into the hydrogenation stage of the cyclopentadiene.

The larger part of the condensate, about 5 to 15, preferably about 8 to 10 times as much as the feed to the column, is conveyed as reflux to the uppermost tray. The residence time of the condensate in the reflux drum is expediently kept as short as possible, preferably less than about 15 minutes.

The product taken from the sump of the column contains less than about 500 p.p.m. and preferably less than about 200 p.p.m. of light ends, and contains less than about 20 p.p.m. and preferably less than about 10 p.p.m. of cyclopentadiene. In addition to about 50–95% by wt. and preferably about 80 to 95% by wt. of cyclopentene, this product contains up to about 20% by wt. and preferably about 3 to 15% by wt. of cyclopentane, up to about 10% by wt. and preferably up to about 2% by wt. of dicyclopentadiene, and up to about 20% by wt. and preferably up to about 5% by wt. of dimers and other heavy ends. Said products is conducted in liquid or in vapor form from the sump of the first column to the middle region, preferably about the 40th to 60th tray, of a second distillation column with about 70 to 120 trays. This column likewise operates at pressures between about 1 and 4 atmospheres and is preferably operated at normal pressure or under a slight excess pressure. The sump of this column preferably consists of a reboiler of low capacity. It is expedient to work at residence times of less than about 5 hours. All heavy ends are drawn off, in particular cyclopentane and dicyclopentadiene, as well as cyclopentene, whose amount is about 2 to 50, preferably about 5 to 30% by wt. The vapors are condensed at the head of the column and partially recycled to the column at a reflux ratio of about 4 to 8, preferably about 5 to 8. The pure cyclopentene which is removed corresponds to the specifications required for polymerization.

When the crude cyclopentene is stored over a longer period after hydrogenation, a large part of the monomeric cyclopentadiene dimerizes. In such cases it has proved advantageous to execute separation of the dicyclopentadiene prior to its introduction into the first column in order to prevent too much dicyclopentadiene accumulating in the sump of the second column. Thus, a particularly advantageous feature of the process according to the invention consists in freeing the crude cyclopentene feed from high-boiling impurities, especially dicyclopentadiene, prior to its entry into the first distillation column. This can be executed by conductng the crude cyclopentene, prior to entry into the first distillation column, into a pre-evaporator with a column containing about 2 to 10, preferably about 3 to 5 trays from whose sump high-boiling components are separated and whose head product is introduced into the middle region of the first distillation column containing 100 to 180 trays. The temperature in the pre-evaporator is expediently between about 70 to 150° C., preferably between about 100 and 150° C. The residence time of the sump product in the evaporator should be kept as short as possible.

It can furthermore be advantageous to partially recycle the sump product of the second column into the pre-evaporator for crude cyclopentene, in order to reduce the content of dicyclopentadiene in the sump of the second column. In this way the danger is further reduced that splitting back to cyclopentadiene will occur. The reflux ratio should be between about 2:1 and 10:1, preferably between about 3:1 and 5:1. If desired, the sump product of the pre-evaporator can be entirely or partially recycled into the dicyclopentadiene splitting stage, e.g. according to the German DOS 2,019,596.

The process of the invention is also suitable for the recovery of pure cyclopentene from crude cyclopentene which is obtained in the boiling range between $C_6$ and $C_{10}$ by splitting and hydrogenating dicyclopentadiene containing about 10% of other hydrocarbons.

The advantage of the process according to the invention over other processes consists in that work is performed with only two normal distillation columns whereby the expenditure of energy is about half that of the expected energy consumption. By recycling the different currents, the yield is distinctly increased as compared with normal distillation.

The percentages given in the following illustrative examples are given as percent by wt.:

EXAMPLE 1

400 cm.³/h. of crude cyclopentene having the feed composition given in Table I were pumped in liquid form at a temperature of 38° C. into the 80th tray of a column consisting of 130 trays. At the head of the column the vaporous head product at a temperature of 39° C. was drawn off and completely condensed in a condenser. The reflux amount of 3600 cm.³/h. flowed back over a gauged flowmeter onto the uppermost tray of the column. The withdrawal of the product at the head was 40 cm.³/h. and the reflux ratio hence 90, or of 9:1 based on reflux to feed.

The composition of the distillate head product can also be seen from Table I. The loss was 2.9% of the starting material at a cyclopentene concentration of 22.6%.

TABLE I

| | Percent by weight | | |
|---|---|---|---|
| | Feed | Distillate | Sump |
| Pentane | 0.80 | 8.0 | [1]<50 |
| Pentene | 1.17 | 11.7 | [1]<50 |
| Isoprene | 0.02 | 0.2 | [1]<50 |
| Cyclopentadiene | 6.50 | 57.5 | [1]<10 |
| Cyclopentene | 77.91 | 22.6 | 84.0 |
| Cyclopentane | 11.40 | | 12.7 |
| Dicyclopentadiene | 0.60 | | 1.5 |
| Dimers plus heavy ends | 1.60 | | 1.80 |

[1] Parts per million.

The reboiler of the column was electrically heated. At the top of the column the pressure was atmospheric. The bottom temperature was 51° C. at a pressure drop in the column of 116 mm. Hg. The composition of the sump product is likewise given in Table I. All light ends are completely separated off and the content of cyclopentadiene is under 10 p.p.m.

The sump product from the first column was pumped by means of a pump directly onto the 50th tray of a second column having 70 trays. The feed temperature was 40° C. In this column the separation between cyclopentene and cyclopentane (boiling point 49.5° C.) was carried out. By means of a magnetic reflux distributor at the head of the column, a reflux ratio of reflux distillate=7 was fixed.

Table II gives an analysis of the head and sump products in this column.

TABLE II

| | Percent by weight | | |
|---|---|---|---|
| | Feed | Distillate | Sump |
| Cyclopentadiene | [1]<10 | [1]<10 | |
| Cyclopentene | 84.0 | 98.1 | 13.5 |
| Cyclopentane | 12.7 | 1.9 | 66.7 |
| Dicyclopentadiene | 1.5 | | 9.0 |
| Dimers plus heavy ends | 1.8 | | 10.8 |

[1] Parts per million.

Complete separation of the cyclopentane is not required as it does not adversely affect polymerization. Test polymerizations showed the cyclopentene recovered in this plant to be very suitable.

EXAMPLE 2

400 cm.$^3$/h. of crude cyclopentene of the feed composition given in Table III were introduced in liquid form at about 20° C. at the 60th tray of a laboratory column of glass which consisted of 110 bubble cap trays. At the head of the column the vapors were completely condensed and conducted into a separator in order to separate off small amounts of water. 3000 cm.$^3$/h. of the organic phase of the separator flowed back as reflux to the uppermost tray of the column and 20 cm.$^3$/h. were removed as distillate. The composition of this product can also be seen from Table III (Distillate 1).

The sump product of the column (Table III) is free of light-boiling components and is introduced at the 40th tray of a second laboratory column having a total of 120 trays. From the head of this column pure cyclopentene (Distillate 2 in Table III) is drawn off. The column is operated at a ratio of reflux to amount of distillate withdrawn=8. At the sump cyclopentane and other heavy ends with a cyclopentene content of 30% are drawn off.

TABLE III

| | Percent by weight | | | |
|---|---|---|---|---|
| | Feed | Distillate 1 | Sump | Distillate 2 |
| Pentane | 0.50 | 10.0 | | |
| Pentene | 1.00 | 20.0 | | |
| Isoprene | 0.01 | 0.2 | | |
| Cyclopentadiene | 1.00 | 20.0 | | |
| Cyclopentene | 91.19 | 44.8 | 93.63 | 99.8 |
| Cyclopentane | 5.00 | 5.0 | 5.00 | 0 |
| Dicyclopentadiene | 0.30 | | 0.32 | |
| Dimers plus heavy ends | 1.00 | | 1.05 | |

EXAMPLE 3

400 cm.$^3$/h. crude cyclopentene having the feed composition as given in Table IV are introduced at the uppermost tray of a stripping section with 5 trays and the vaporous head product of this column directly conducted to the 80th plate of the first column of Example 1 and further worked up according to the method described in Example 1. Results were obtained comparable with those in Example 1. The vaporous head product of the stripping section has a composition as given in Table IV. At the sump of the stripping section about 10 cm.$^3$/h. of dicyclopentadiene and other high-boiling components are drawn off at a sump temperature of 120 to 150°C. This product still contains about 7% of cyclopentene as can be seen from Table IV.

TABLE IV

| | Percent by weight | | |
|---|---|---|---|
| | Feed | Head | Sump |
| Pentanes | 0.80 | 0.82 | |
| Pentenes | 1.17 | 1.20 | |
| Isoprene | 0.02 | 0.02 | |
| Cyclopentadiene | 3.50 | 6.67 | |
| Cyclopentene | 75.91 | 79.73 | 7.0 |
| Cyclopentane | 11.40 | 11.56 | 5.0 |
| Dicyclopentadiene | 3.60 | | 24.0 |
| Dimers plus heavy ends | 3.60 | | 64.0 |

EXAMPLE 4

Crude cyclopentene of the composition given in Table V is supplied, as in Example 3, to the head of the stripping section of the pre-evaporator and introduced in vaporous form into the first distillation column. 70% of the head product of this column was returned to the splitting column for dicyclopentadiene. The operating conditions for the second column correspond to those of Example 1. The sump product of this second column was partially returned to the stripping section of the pre-evaporator. The ratio of the recycled amount of the amount withdrawn from the sump was 3:1. As a result the content of dicyclopentadiene in the sump of the second column was reduced to about 3%.

TABLE V

| | Percent by wt. |
|---|---|
| Pentanes | 2.00 |
| Pentenes | 0.50 |
| Isoprene | 0.01 |
| Cyclopentadiene | 0.30 |
| Cyclopentene | 80.00 |
| Cyclopentane | 2.00 |
| $C_6$-hydrocarbons | 6.00 |
| $C_7$–$C_{10}$ hydrocarbons | 3.00 |
| Dicyclopentadiene | 1.00 |
| Dimers+heavy ends | 5.19 |

It will be appreciated that the instant specification and examples are set forth by way of illustration and not limitation and that various modifications and changes may be made without departing from the spirit and scope of the present invention.

What is claimed is:

1. In the production of pure cyclopentene by thermally splitting dicyclopentadiene to a product comprising cyclopentadiene, hydrogenating the product to convert cyclopentadiene to cyclopentene, and distilling the product in a cyclopentene-distillate to recover pure cyclopentene, the improvement which comprises delivering the cyclopentene-containing product to be distilled to about the 60th to 90th tray of a cyclopentadiene-distillate column having about 100 to 180 trays, boiling off at the head of said column cyclopentadiene and other low-boiling components, condensing the distillate and recycling the major portion thereof to said column to establish a ratio of reflux to feed of about 5–15:1, withdrawing as the residue from said column a product containing less than about 20 p.p.m. of cyclopentadiene, and delivering said distillation residue to said cyclopentene-distillate column, the residue in said cyclopentene-distillate column comprising cyclopentane and other high-boiling components.

2. The process according to claim 1, wherein prior to introduction into the cyclopentene-distillate column the crude cyclopentene is introduced into a pre-evaporator with about 2 to 10 plates, high-boiling components being separated from the sump of the pre-evaporator and the distillate constituting the feed to said cyclopentadiene-distillate column.

3. The process according to claim 2, wherein the distillation residue of said cyclopentene-distillate column is partially recycled to the pre-evaporator.

4. The process according to claim 1 wherein the head product of the cyclopentadiene-distillate column is recycled at least in part of the splitting stage of the dicyclopentadiene or to the hydrogenation stage of the cyclopentadiene.

5. The process according to claim 2 wherein the sump product of the pre-evaporator is recycled at least in part to the splitting stage of the dicyclopentadiene.

6. The process according to claim 3, wherein the head product of the cyclopentadiene-distillate column is recycled at least in part to the splitting stage of the dicyclopentadiene or to the hydrogenation stage of the cyclopentadiene and the sump product of the pre-evaporator is recycled at least in part to the splitting stage of the dicyclopentadiene.

References Cited
UNITED STATES PATENTS 3,565,963   2/1971   Tablet et al. _____ 260—666 A DELBERT E. GANTZ, Primary Examiner V. O'KEEFE, Assistant Examiner U.S. Cl. X.R.

260—666 PY